A. KINGSBURY.
BEARING.
APPLICATION FILED JAN. 23, 1918.
1,421,695.
Patented July 4, 1922.
2 SHEETS—SHEET 2.
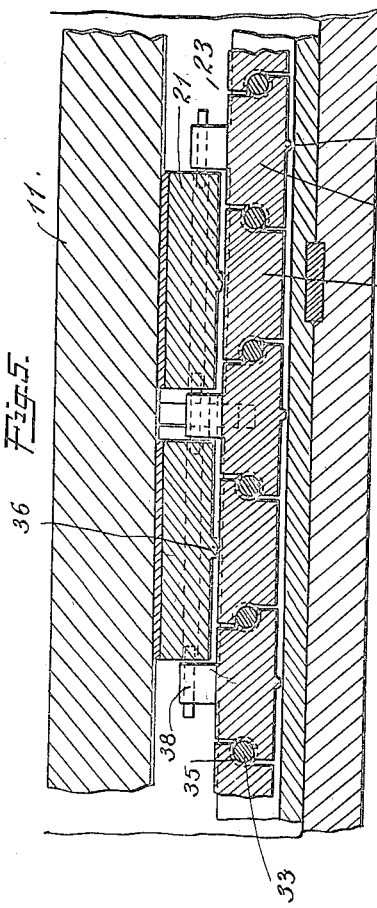
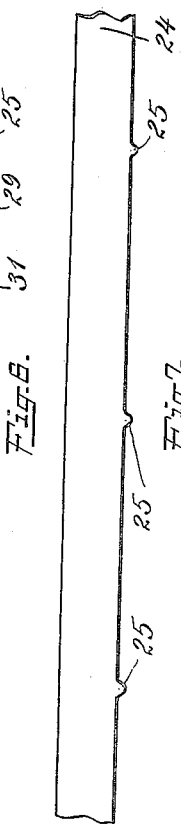
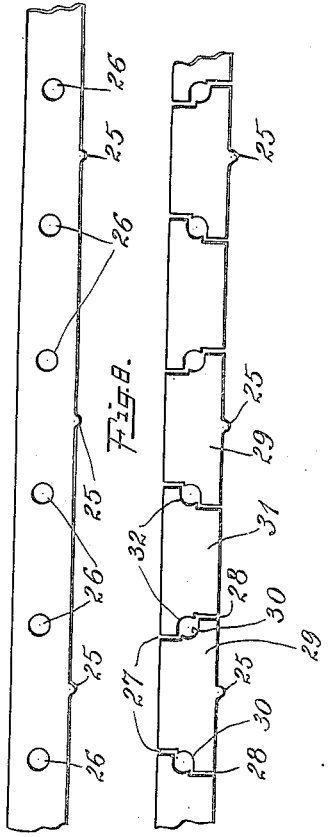
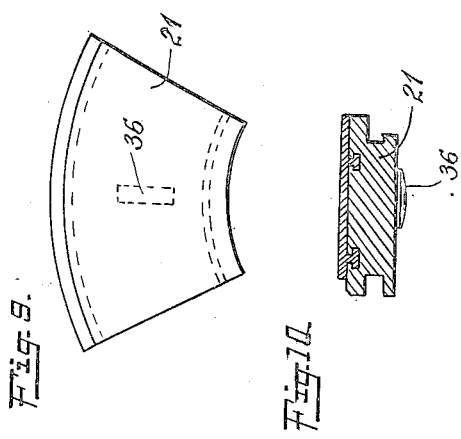
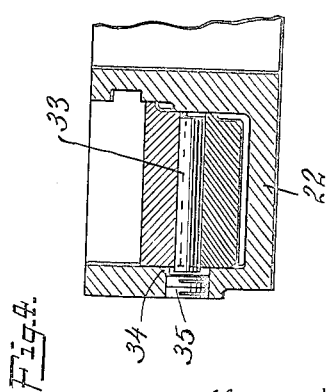
INVENTOR
Albert Kingsbury
BY
Marshall & Dearborn
ATTORNEYS

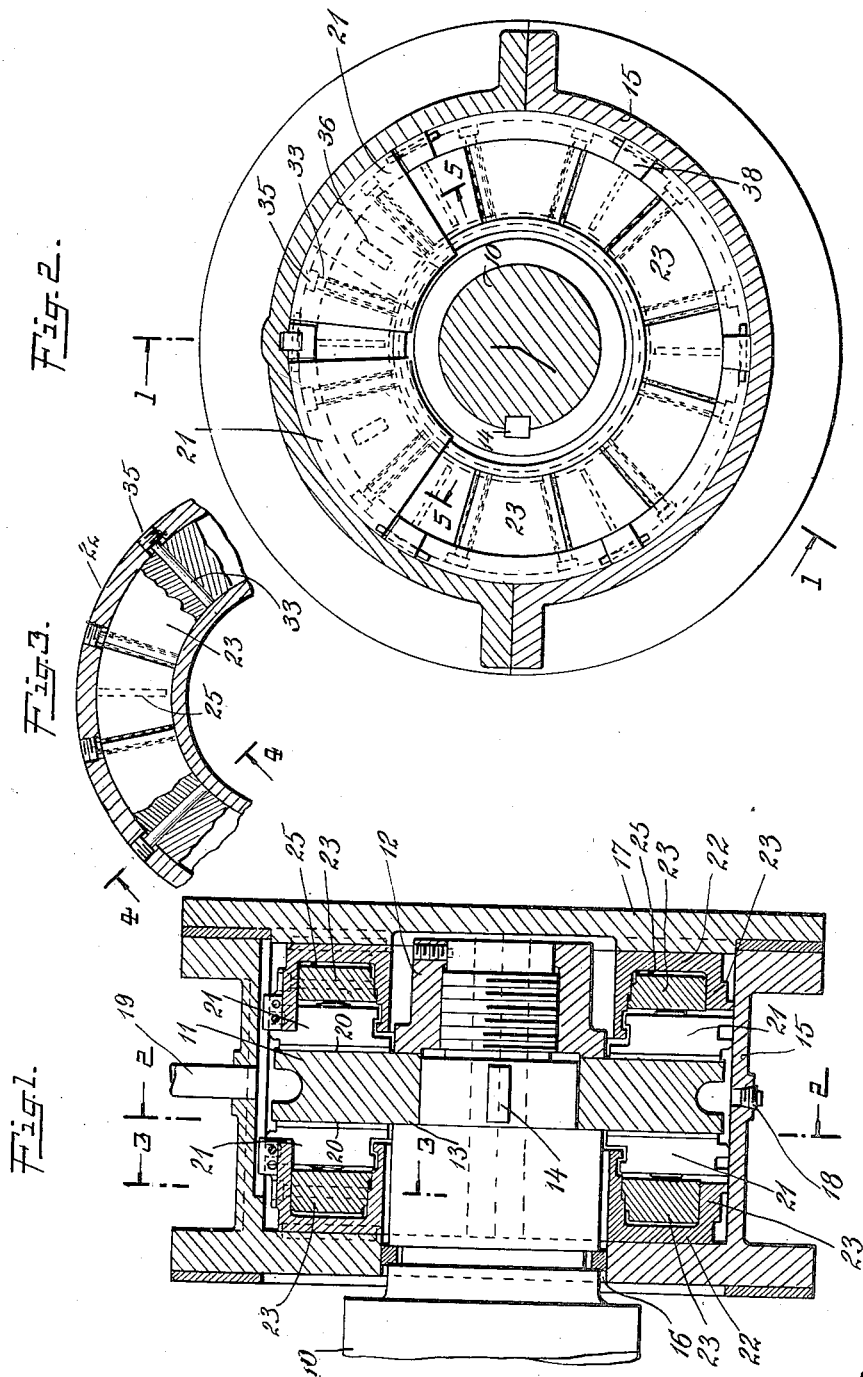

UNITED STATES PATENT OFFICE.

ALBERT KINGSBURY, OF PITTSBURGH, PENNSYLVANIA.

BEARING.

1,421,695.                    Specification of Letters Patent.           Patented July 4, 1922.

Application filed January 23, 1918. Serial No. 213,287.

*To all whom it may concern:*

Be it known that I, ALBERT KINGSBURY, a citizen of the United States of America, and a resident of Pittsburgh, Allegheny County, and State of Pennsylvania, have invented certain new and useful Improvements in Bearings, of which the following is a specification, reference being had to the accompanying drawings, forming a part thereof.

My invention relates to bearings and has special reference to thrust bearings of the type wherein bearing segments are so constructed and mounted as to flex or tilt automatically in response to the wedging action of the lubricant between the bearing surfaces.

One object of my invention is to provide, in a bearing of the aforesaid character, simple and improved means for equalizing or equitably distributing the pressure among the several bearing segments, that shall be flexible and substantially continuous, and which may be conveniently employed in constructing equalizing means that are annular in shape.

Another object is to provide an equalizing means comprising a plurality of interdependent members and rolling members between them.

Another object is to provide an effective method of manufacturing an equalizing means of this kind that shall be simple in character and economical of material, and materially reduce the cost of manufacturing the bearing.

In order that my invention may be thoroughly understood I will now proceed to describe the same in the following specification and then point out the novel features thereof in appended claims.

The invention is capable of receiving a variety of mechanical expressions, one of which is shown on the accompanying drawings, but it is to be expressly understood that the drawings are for purposes of illustration only and are not to be construed as a definition of the limits of the invention, reference being had to the appended claims for that purpose.

Referring to the drawings:

Figure 1 is a longitudinal section of a bearing arranged and constructed in accordance with my invention and constituting an embodiment thereof. The view is taken on the line 1—1 of Figure 2.

Figure 2 is a transverse sectional view on the line 2—2 of Figure 1.

Figure 3 is a sectional detail taken on the line 3—3 of Figure 1, showing particularly my improved means for equalizing or equitably distributing the pressure among the several bearing segments.

Figure 4 is a transverse section of the equalizing means taken on the line 4—4 of Figure 3.

Figure 5 is a sectional view, taken on the line 5—5 of Figure 2, developed into a single plane and drawn to a larger scale.

Figures 6, 7 and 8 are detail views illustrating the steps in my improved method of manufacturing the equalizing means and Figures 9 and 10 are detail views of one of the bearing segments or shoes.

In the structure illustrated 10 designates the shaft and 11 a thrust collar affixed thereto in any suitable way, as by a nut 12 which presses it against a shoulder 13 and a key 14 which prevents its turning relative to the shaft. The thrust collar is disposed in a bearing housing 15 which in the embodiment illustrated has the form of a hollow cylinder or drum with an opening 16 in the end through which the shaft 10 extends, and a removable cover plate 17. 18 designates an oil drain plug at the bottom of the housing, and 19 an oil inlet pipe at the top.

The thrust collar 11 has a pair of annular bearing surfaces 20 with which a plurality of bearing segments or shoes 21 engage. Disposed in the housing near its respective ends are base rings 22 in which equalizers 23 are mounted, the bearing shoes 21 being tiltably mounted on said equalizers.

My present invention is particularly concerned with the systems of equalizers, together with the method of making the same, and the base rings which are combined therewith to form what may be conveniently termed "equalizing structures". The equalizing structures are alike and of course only one will be necessary for a uni-direction thrust bearing.

Referring particularly to Figures 3 to 8 inclusive, each of the base rings 22 is shown as having the form of an annular channel, being substantially U-shape in section. The equalizer is preferably made by subjecting to the following successive operations a suitable blank, such as the ring 24 shown in Figure 6, which ring may be provided with a plurality of spaced projections on one or both of its upper and lower faces to provide rocking or tilting bearings as hereinafter explained, said projections being shown as on the lower face only and taking the form of radial ribs or knife edges 25.

A plurality of radial holes 26 are first drilled or otherwise formed in the ring at substantially equal intervals determined by the desired number and size of the equalizer plates which are to form parts of the complete structure.

The ring is next radially slotted at 27 and 28, the slots being positioned so as to break into the holes 26 and divide the ring into a plurality of equalizer plates. The cuts 28 at the respective sides of each of the knife edge projections 25 are separated as far as it is possible to separate them, and still have them break into the holes. The cuts 27 on the opposite side, which complete the equalizer plates are disposed relatively close together. In this way the ring 24 is divided into a number of equalizer plates 29 having radial knife edge supporting projections 25 and curved ledges 30, and a number of briging plates 31, each of which has overhanging projections with curved edges 32 and is adapted to bridge a pair of plates 29.

The equalizing structure is completed by mounting the equalizing plates 29 and 31 in the bottom of the channel-shaped base ring 22 and inserting rolling members such as pins 33 in the holes 26 between said plates 29 and 31. When pins 33 are used they are preferably made a little longer than the plates are wide so that they extend loosely into holes 34 in the outer wall of the base ring. The outer ends of these holes may be closed by plugs 35 to prevent the pins working out. The pins 33 which constitute bearing rollers are intended to be illustrative of any suitable rolling bearing members, and for example, may be replaced by one or more balls or the like, independent means then being used for holding the plates in position. These pins are of slightly smaller diameter than the holes 26 and act as roller connections between the adjacent ends of the assembled equalizer plates, thereby securing great flexibility and ease of movement between the annularly disposed elements of the divided ring.

The pins also serve to hold the plates in position but since they fit loosely into the holes 34 they do not interfere with the rocking of the plates incident to the automatic equalization or equitable distribution of the pressure among the several segments or shoes.

The bearing segments or shoes are preferably provided with spherical or cylindrical faced lugs or projections 36 (see Figs. 10 an 9 respectively) and are mounted on the blocks 31, but if desired, the blocks 31 may be provided with the outwardly extending knife edge projections on which the shoes are mounted.

The shoes are held in position relative to each other and are prevented from turning with the thrust collar in the form shown, by means of lugs 38 which are attached to the housing 15 and extend inwardly between the edges of adjacent shoes.

The construction shown and described requires only relatively simple machining operations such as drilling and sawing as above indicated and, furthermore, the complete system of equalizer plates is formed from a single blank without waste. The pins or rollers between the shoes are a particularly effective and simple means of accomplishing the joint purpose of providing a rolling bearing between the parts of the equalizer and of holding the parts loosely in position.

When the equalizing structure, and the bearing segments or shoes tiltably supported thereon, are subjected to end thrust, the individual elements 29 and 31 of the divided ring structures 23—24 flex or tilt longitudinally or circumferentially in such manner as to automatically equalize or equitably distribute the thrust pressure on all of said bearing members. In this action the divided ring acts in precisely the same manner as the original integral ring member 24 would do if the latter was made thin and pliant. The division of the integral ring into a series of short sectors, and the flexible interconnection of these sectors at their overlapping adjacent ends, permits the desired longitudinal flexibility to be obtained without any reduction in the cross-section of the ring. The interposition of the rolling or rocking elements 33 between the interconnected overlapping ends of the equalizer ring parts reduces the resistance to the relative movement between the said parts and thus contributes to the attainment of the greatest possible longitudinal or circumferential flexibility of the ring as a whole  But the members 29 and 31 which are cut from the integral ring 24 together with the roller members 33,— when they are assembled in position and subjected to transverse pressure—constitute, in effect and action, a substantially continuous flexible ring structure which performs the same functions in equalizing or equitably distributing the pressures on the various bearing segments or shoes supported thereby as would be performed, in somewhat lesser degree and with somewhat less efficiency, by a longitudinally flexible integral ring correspondingly mounted (on separated knife edges 25—25, etc.) on the base ring 22. For this reason I do not herein broadly claim any such "equalizing structure" as that just described as that is the subject matter of a much earlier application (see No. 80,569 filed Feb. 26, 1916). Nor is the method of making the equalizing means claimed herein, such forming the subject-matter of claims in my copending application Serial No. 447,693 filed Feb. 25, 1921. The structure herein described may however be quite widely varied—particularly as to the shape of the equalizing means, which for example need not be a complete annulus, and as to the nature of the "rolling" connections between the divided ring sectors—and I intend that only such limitations be imposed as are indicated in the appended claims.

What I claim is:

1. In a bearing, the combination with bearing means, of an equalizing system for distributing the pressure thereon comprising a plurality of interdependent members, and means for reducing the friction between said members and increasing the flexibility of the equalizing system.

2. In a bearing, the combination with bearing means, of an equalizer for distributing the pressure thereon comprising a plurality of interdependent members, and rolling bearings between said members.

3. In a bearing, the combination with bearing means, of a substantially continuous equalizer comprising a plurality of interdependent members, and means for providing a rolling bearing connection between the members and for holding the members in position.

4. In a bearing, the combination with bearing means, of a substantially continuous equalizer comprising a plurality of interdependent members, and rolling bearings between said members.

5. In a bearing, the combination with bearing means, of an equalizer comprising a plurality of interdependent members and rolling bearings between said members, and a retaining wall adjacent to said equalizer and having spaced holes substantially opposite said rolling bearing members through which the latter are removable.

6. In a bearing, the combination with bearing means, of an equalizer comprising a plurality of equalizer plates, bridging plates mounted on adjacent pairs of the equalizer plates and interposed bearing pins between the plates, a retaining wall adjacent the equalizer and having spaced holes into which the bearing pins extend, and removable plugs in the holes for removably holding the pins in position.

7. An equalizer for thrust bearings comprising a plurality of spaced equalizer plates, bridging plates interposed between the equalizer plates, and roller bearing pins connecting the adjacent ends of the two sets of plates.

8. An equalizer for thrust bearings comprising a plurality of separated equalizer plates, bridge plates interposed between the equalizer plates, and a rolling bearing connection between the ends of adjacent plates.

9. An equalizer for thrust bearings comprising a plurality of spaced equalizing plates, bridging plates mounted upon adjacent ends of the equalizer plates, and means interposed between the plates to form roller bearing connections therefor.

10. An equalizer for thrust bearings comprising a plurality of sector-shaped equalizing plates, bridging plates mounted on adjacent ends of the equalizing plates, and radial pins forming roller bearing connections between the plates.

11. An equalizer for thrust bearings comprising a plurality of sector-shaped equalizing plates, bridging plates mounted on adjacent ends of the equalizing plates, and radial pins forming roller bearings between the plates and extending outwardly to hold the plates in position without interfering with the equalizing action of the structure.

12. An equalizing structure for thrust bearings comprising a base ring having an annular channel formed therein, a plurality of equalizing plates tiltably mounted in the bottom of the channel, bridge plates mounted on the equalizing plates, and rolling members interposed between the ends of the plates.

13. An equalizer for thrust bearings comprising a base member having a channel formed therein, recesses in one wall of the channel, a plurality of equalizing plates mounted in the bottom of the channel, bridging plates mounted on the equalizing plates, and independent members associated with the plates and extending into the recesses for holding the plates in position without interfering with the equalizing action.

14. An equalizing structure for thrust bearings comprising a base ring having an annular channel formed therein, radial recesses in one wall of the channel, a plurality of plates tiltably mounted in the bottom of the channel, bridging plates mounted on the equalizing plates, and interposed bearing pins extending radially into the recesses of the base ring.

15. An equalizer for thrust bearings comprising a plurality of separated equalizer plates, and bridging plates mounted upon adjacent ends of the equalizer plates, the overlapping ends of said plates having a rolling bearing connection therebetween.

16. An equalizer for thrust bearings comprising a substantially-continuous flexible series of overlapped plates and rolling bearings between the overlapped ends of said plates.

17. An equalizer for thrust bearings comprising a substantially-continuous flexible series of overlapped plates having radial apertures at the overlapping ends of said plates and rollers in said radial apertures.

18. An equalizer for thrust bearings comprising a substantially-continuous flexible series of overlapped plates, the overlapped ends of said plates being constructed to coact with rolling bearing members, and rolling bearing members interposed between the overlapped ends of said plates.

19. In a bearing, in combination with bearing means, a substantially-continuous flexible equalizer comprising a plurality of interdependent members having a rolling bearing connection therebetween.

20. In a bearing, in combination with bearing means, an equalizer therefor comprising a series of interdependent members, a base member on which said interdependent members are mounted, and means coacting with said base and interdependent members and providing positioning means and rolling bearing connections for said interdependent members.

21. In a bearing, in combination with a plurality of bearing segments, means for equitably distributing the pressure on said segments comprising a series of plates having their adjacent ends in overlapped relationship and rolling means interposed between said overlapped ends.

22. In a bearing, in combination with a plurality of bearing segments, means for equitably distributing the pressure on said segments comprising a series of interdependent members and means interposed between the adjacent ends of said members affording a rocking connection therebetween.

23. In a bearing, in combination with a plurality of bearing segments, means for equitably distributing the pressure on said segments comprising a series of overlapping members having anti-friction means between the adjacent ends of said members.

In witness whereof, I have hereunto set my hand this 18th day of January, 1918.

ALBERT KINGSBURY